United States Patent

[11] 3,568,806

| [72] | Inventor | Lowell T. Butt<br>Chesapeake, Va. |
|---|---|---|
| [21] | Appl. No. | 853,447 |
| [22] | Filed | Aug. 27, 1969 |
| [45] | Patented | Mar. 9, 1971 |
| [73] | Assignee | The United States of America, as<br>represented by the Secretary of the Navy |

[54] TORSION YIELD SHOCK MOUNT
9 Claims, 10 Drawing Figs.

[52] U.S. Cl. .................................................. 188/1,
248/163, 267/154
[51] Int. Cl. ................................................... F16f 7/12
[50] Field of Search .......................................... 188/1B, C;
248/20, 163, 358; 267/154

[56] References Cited
UNITED STATES PATENTS
3,239,207  3/1966  Camossi ...................... 188/1(B)UX Primary Examiner—Duane A. Reger
Attorneys—Edgar J. Brower, Thomas O. Watson, Jr. and Boardman S. Mowry ABSTRACT: A shock mount for shipboard equipment comprising two sets of hexagonally arranged links rigidly interconnected by tubular pin units having inner and outer tubes. Sudden shock energy of a sufficient amount received by the vessel will cause the hexagonal frames to permanently collapse by virtue of torsional yielding of the inner tubes of the pin units. This will reduce the shock energy transmitted to the equipment to a tolerable amount.

PATENTED MAR 9 1971 3,568,806

INVENTOR
LOWELL T. BUTT

BY Thomas O. Watson Jr.
Boardman S. Mowry
ATTORNEYS

TORSION YIELD SHOCK MOUNT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention pertains to shock mounts and, more particularly, to shock mounts for shipboard equipment. The mount of the invention permanently yields to use up shock energy and thus reduces the amount of such energy transmitted to the equipment.

Shipboard machinery and other equipment is normally attached directly to this ship's structure through a foundation of rigid construction. Should there be an underwater explosion near the ship, the ship's structure will experience violent and great accelerations upwardly and also normally in the athwartship directions. An explosion that is near enough and of sufficient magnitude will severely damage and/or put rigidly attached shipboard equipment out of operation. The invention is directed to a shock mount which will transmit a very substantially reduced amount of kinetic energy to the supported equipment so as to protect such equipment.

The mount of the present invention is the only one so far as is known in which shock energy is used up or permanently dissipated to thereby transmit to the equipment a greatly reduced amount of shock energy which is well within the ability of the equipment to accept without being rendered inoperative or greatly damaged.

SUMMARY OF THE INVENTION

In the shock mount of the invention, work in the form of substantial permanent distortion is done, thus to use up some of the shock or kinetic energy applied to the mount from the structure of the ship as the result of an underwater explosion near the ship. There is therefore a reduced amount of such energy to be passed on to the supported equipment. The mount can be designed by the selection of the lengths of the links and of the inner tubes thereof and also of the diameter and wall thickness thereof to use up sufficient energy to bring the amount passed on to the equipment to a level which can safely be taken by such equipment. No mounts presently known do the above.

OBJECTS OF THE INVENTION

It is a primary object of the invention to provide a mount for supporting shipboard equipment which will use up sufficient shock or kinetic energy coming to the mount from the structure of the ship to protect the equipment and prevent the same from being rendered inoperative.

Another object is to provide such a mount which is simple, inexpensive, and requires no maintenance.

A further object is to provide such a mount which can assume a wide variety of forms suitable for the particular application or according to preference.

A still further object is to provide such a mount which can be restored to its original condition after suffering deformation as the result of an underwater explosion.

Other objects, advantages and novel features of the invention will become apparent from the following detailed description of the invention when considered in conjunction with the accompanying drawings.

DESCRIPTION OF THE PREFERRED EMBODIMENTS

Figure 1:
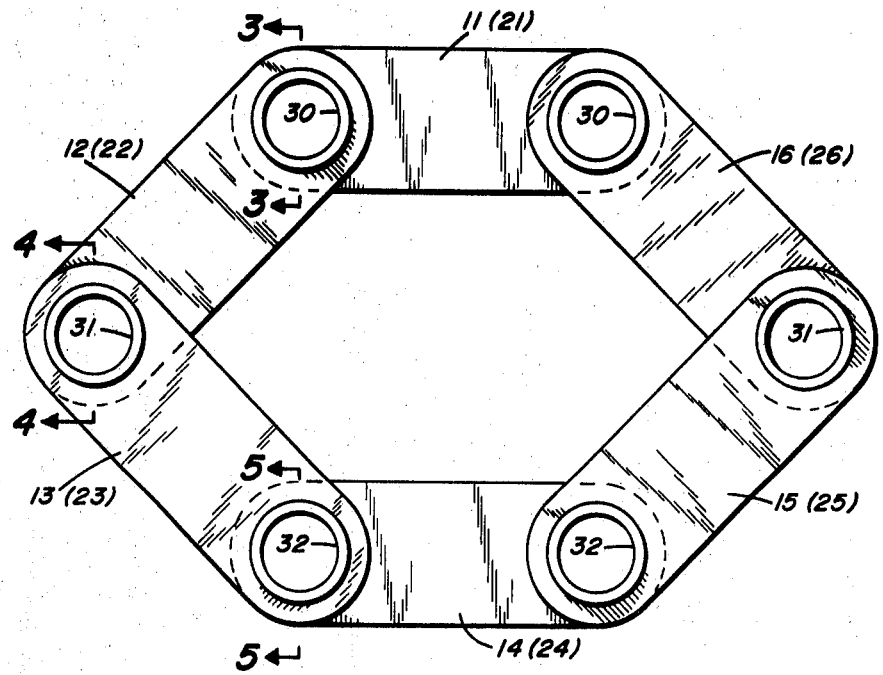
FIG. 1 is a front elevational view of one form of shock mount according to the present invention.
Figure 2:
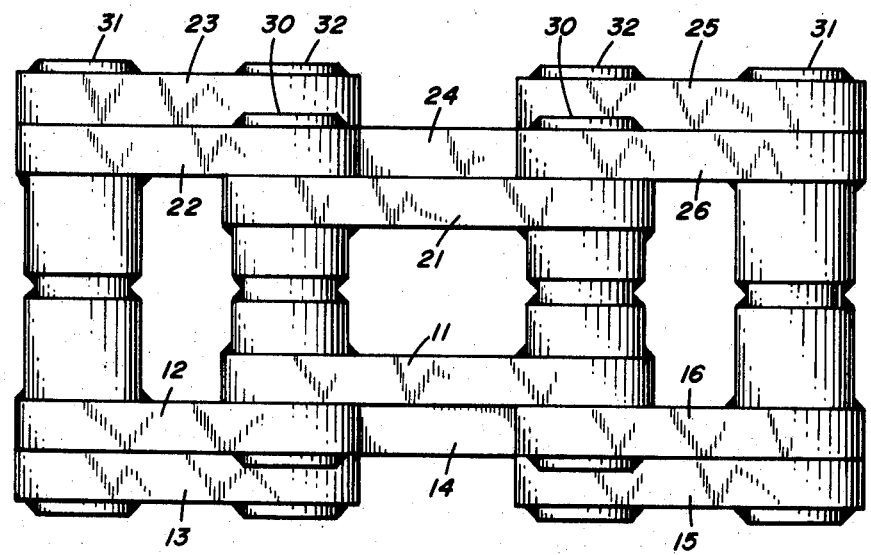
FIG. 2 is a top plan view of the same.

Referring to the drawing FIGS. in detail and first to FIG. 1-—7, the reference numeral 10 generally designated one form of the torsion yield shock mount of the present invention. The mount comprises a first set of generally hexagonally arranged links 11—16 with the link ends overlapping slightly and a second set of generally hexagonally arranged links 21—26 in spaced, parallel relation to the first set of links. The links of the second set are like those of the first set and arranged coextensively therewith except that the links of the second set are reversed or turned over sidewise relative to the corresponding links of the first set.

The two link sets are connected together by pin units located at the junctures or overlapping portions of the links of each set to form a double frame structure. All of the pin units are of similar construction differing only in the lengths of their parts. The numeral 30 generally designates the two upper pin units which are of identical construction, the numeral 31 generally designating the two intermediate pin units which are of identical construction while the numeral 32 generally designates the lower pair of pin units which are of identical construction to each other and to pin units 31.

Considering the pairs of links consisting of links 11 and 12 and 21 and 22, for example, the upper links 11 and 21 are provided with cylindrical bores 35 and 45, respectively (see FIGS. 3 and 7) through which extend outer cylindrical tubes 60 and 61, respectively of one of the pin units 30. The links 12 and 22 are provided with cylindrical bores 36 and 46, respectively through which extends inner cylindrical tube 62 of the pin unit 30. The latter tube also extends through the outer tubes 60 and 61 being connected thereto by annular welding 63 and 64. The inner tube 62 is also connected to the links 12 and 22 by annular welding 65 and 66. The outer tubes 60 and 61 are also connected to the links 11 and 21 by the annular welding 67 and 68, respectively. The links 12 and 22 are each circularly counterbored on the inner sides thereof at 70 and 71, respectively, for reception of the outer end portions of the cylindrical tubes 60 and 61, this reception providing for relative rotation between the outer tubes 60 and 61 and links 12 and 22. The pin unit construction and its manner of connection to the links 11 and 12 and 21 and 22 provide a rigid connection of these links together.

Figure 4:
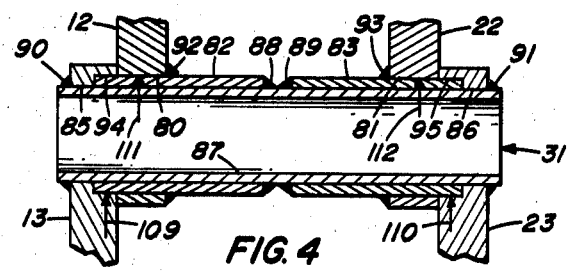
FIG. 4 is a fragmentary sectional view taken on line 4-4 of FIG. 1.

Referring to FIG. 4, the lower ends of the links 12 and 22 are provided with cylindrical bores 80 and 81 of the same size as the bore 35 and 45 mentioned above for the reception of cylindrical outer tubes 82 and 83, respectively, of one of the pin units 31. The upper ends of the links 13 and 23 are provided with cylindrical bores 85 and 86 of the same size as the bores 36 and 46 above covered. A cylindrical inner tube 87 which is somewhat longer than inner tube 62 is provided in this pin unit 31 being annually welded to the outer tubes 82 and 83 at 88 and 89 and to 13 and 23 at 90 and 91 the outer links. The outer tubes 82 and 83 are annually welded to their inner links 12 and 22 at 92 and 93. The links 13 and 23 are also cylindrically counterbored at 94 and 95 for rotatable reception of outer tubes 82 and 83 relative thereto.

Considering the links pairs 13 and 14 and 23 and 24, the lower links 14 and 24 are of identical construction to the top links 11 and 21, respectively, and are located in the same planes as links 12 and 22, respectively, said lower links being the inner rather than the outer links of said link pairs. The lower ends of the links 13 and 23 are of identical construction to that of the upper ends of these links, that is, the bores 98 and 99 of these links are counterbored at 100 and 101 in identical fashion to the boring and counterboring at the upper ends of these links. The pin unit 32 connecting links 13 and 14 and 23 and 24 is identical to the pin units 31 the parts of unit 32 being identified by the same reference numerals used for the unit 31 above described. The pin unit 32 is also connected to the inner and outer links of its pairs of links 13 and 14 and 23 and 24 in the same fashion as described in connection with the connection of the pin unit 31 above described to links 12 and 13 and 22 and 23, respectively.

The construction of the mount to the right of the vertical center plane thereof as the mount is viewed in FIG. 1 is identical to that to the left of said center plane.

The lower links 14 and 24 are secured to a deck of a vessel either directly or indirectly by intermediate support means as by welding along the lower edges of said links. Preferably the shock mount is so attached to the deck that the two sets of links run perpendicular to the longitudinal vertical center plane of the vessel. Normally two pairs of the shock mount are employed one mount being at each corner of a piece of machinery or to other equipment being supported thereon. Such piece of equipment is secured to the top links 11 and 21 of the mounts directly or through other means as by welding. The mount may be used for the support of any equipment such as communication, electrical, generators, and pumps, or the mount may be used to support a platform upon which personnel may stand for the reduction of shock energy to the equipment or personnel thereupon to allowable or tolerable amounts.

OPERATION FIGS. 1—7)

Considering the operation of the device, an underwater explosion occuring in the vicinity of the vessel as from a mine or bomb, for instance, causes a tremendous shock wave to strike the vessel which lifts the vessel under rapid acceleration as well as normally causing substantial shock to the vessel in the athwartship direction which also is transmitted to the present mount. The rapidly lifting deck tends to collapse the mount due to the inertia of the equipment mounted on the mount. Such collapsing of the mount where the shock energy is great enough is permitted by the present mount as will now be explained.

As can be visualized, the tendency to so reduce the height or collapse the frame will tend to rotate or pivot the links of the link pairs 13 and 14 and 23 and 24 about their pin unit 32 so as to increase the angle between the links. The same tendency to increase the angle will also apply to the link pairs 11 and 12 and 21 and 22, for instance, while the link pairs 12 and 13 and 22 and 23, for instance, will tend to close or reduce the angle there between. Regardless of the links pairs considered, therefore, a torque will be applied to the pin units between the various link pairs.

Figure 3:
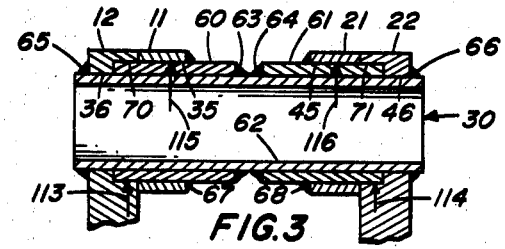
FIG. 3 is a fragmentary sectional view taken on line 3-3 of FIG. 1.
Figure 7:
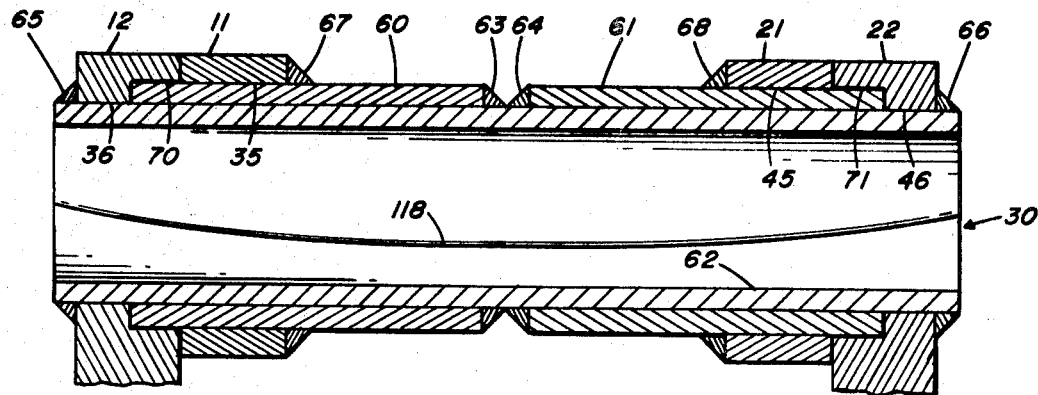
FIG. 7 is an enlarged fragmentary sectional view taken on line 7-7 of FIG. 6 showing the permanent twisting that has taken place in the inner tube as the result of the collapsing of the shock mount.

The tendency of the links of the link pairs 11 and 12 and 21 and 22 to rotate relative to each other applies a torque to the pin unit 30 as above indicated. This torque is applied to the unit between the annular welds 67 and 68 and the welds 65 and 66, (see FIGS. 3 or 7) the torque occasioned by the tendency of the links 11 and 12 to pivot farther apart passing through the outer tube 60 between the welds 67 and 63 and through the inner tube 62 from the weld 63 to the weld 65. The torque occasioned by the tendency of the links 21 and 22 to swing farther apart passes through the outer tube 61 between the welds 68 and 64 and through the right hand half of the inner tube as seen in FIGS. 3 and 7 between the welds 64 and 66.

Inasmuch as the ability of a tube to take torsional stressing before yielding occurs, that is, the yield point is reached, varies according to the cube of the radius of the tube. The yield point for torsional stressing will occur much sooner in the inner tube 62 than it will in the outer tubes 60 and 61 due to the smaller diameter of the inner tube. Where inner and outer tubes are used to make a composite construction as in the present device, all of the torsional yielding will take place in the inner tube 62 for allowing the rotation of the links 11 and 12 and 21 and 22 relative to each other for participation in the partial or total collapse of the shock mount while the torsional stressing in the outer tubes 60 and 61 will be within the elastic range thereof and therefore the latter tubes will not yield. The kinetic energy employed in causing the torsional yielding of all of the inner tubes of the shock mount will no longer exist so as to be passed on through the mount into the equipment supported thereby, thus to materially reduce the shock or kinetic energy that the latter equipment will have to withstand. The mount is intended to be designed for its particular application so that it will use up or dissipate sufficient kinetic energy coming to it to hold the remaining energy which is passed by it to the equipment to tolerable levels that will not seriously damage the equipment or put it out of operation.

While the inner tubes of the shock mount do all of the yielding in torsion, these tubes are stressed very little or not at all in shear thus to allow these tubes to be stressed nearly exclusively in torsion alone to use up the maximum amount of shock or kinetic energy for the dimensions of the inner tubes. Virtually all of the stressing in shear in the pin units occurs in the outer tubes thereof since such outer tubes are of greater diameter than the inner tubes and therefore have more material there around to provide far stronger tubes which take the shear loads thus relieving the inner tubes of virtually all of the shear stressing. It is important to point out that the stressing in shear in the outer tubes takes place outwardly of the welds between these tubes and the links to which they are connected, i.e. welds 67 and 68 for example, where there is no torsional stressing whatsoever in such outer tubes.

Figure 5:
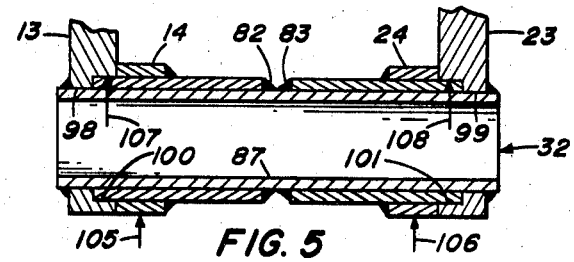
FIG. 5 is a fragmentary sectional view taken on line 5-5 of FIG. 1.
Figure 6:
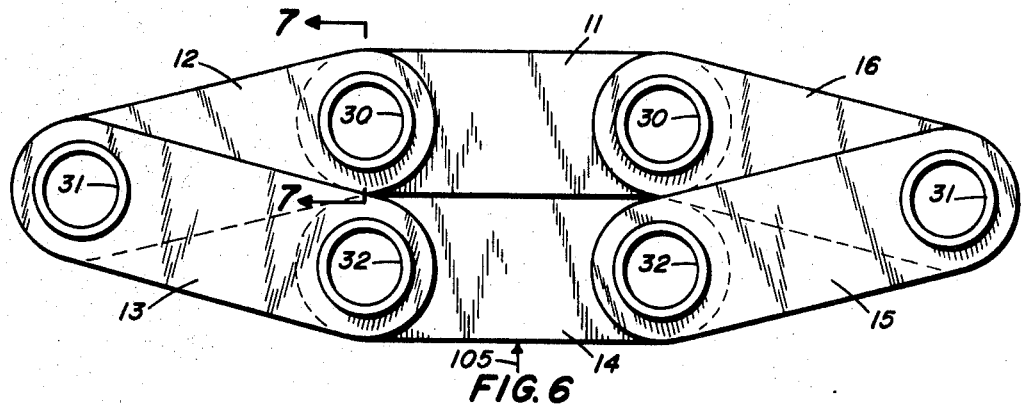
FIG. 6 is a view like FIG. 1 but with the mount shown in the fully collapsed condition.

Considering shock or kinetic energy being applied to links 14 and 24, the force involved, 105 and 106 in FIGS. 5 and 6, will pass into the outer tubes 82 and 83 of the pin unit 32 and then from the latter into the links 13 and 23 through the counterbores in the lower ends of these links. The passage of this force is indicated by the arrows 107 and 108. The force travels up links 13 and 23 immediately passes into the outer tubes 82 and 83 of the pin unit 31 through the counterbores 94 and 95 of the links. This passage of force is indicated by arrows 109 and 110 in FIG. 4. The force will then pass from said outer tubes into links 12 and 22 as indicated by the arrows 111 and 112 and thence into outer tubes 60 and 61 (See FIG. 3) through counterbores 70 and 71 as indicated by arrows 113 and 114. The force then passes from the latter tubes into upper links 11 and 21 as indicated by arrows 115 and 116.

It is also pointed out that where shock occurs which is of sufficient magnitude to cause some permanent deformation or yielding some or all of the inner tubes in torsion but not of sufficient magnitude to cause total collapse of the shock mount, additional shock or shocks may be taken by the mount for further deformations or collapsing of the latter for reduction of the shock or shocks transmitted to the supported equipment until the shock mount is completely collapsed as shown in FIG. 6. When such total collapse has taken place, of course, the mount cannot afford any more protection to the equipment. FIG. 7 shows the permanent twisting that has taken place in the inner tube 62 of the pin unit 30 upon total collapse of the shock mount, the curved form of line 118 indicating this twisting or torsion. Preferable tubing, which is seamless and more accurate in dimensions than pipe, should be used rather than pipe but the use of the words "tube" and "tubes" in the appended claims is intended to include pipe and the like.

Figure 8:
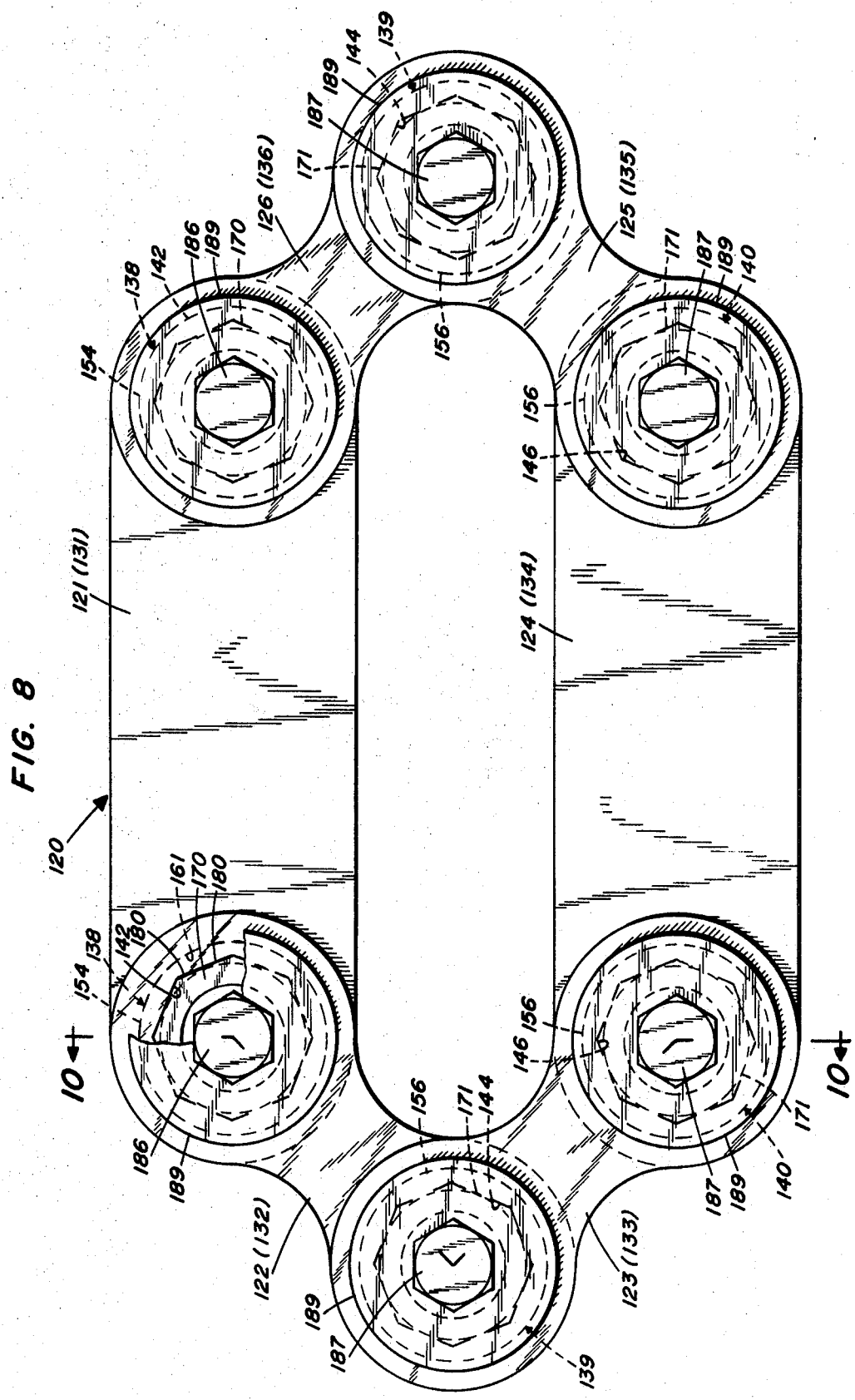
FIG. 8 is a front elevational view of another form of shock mount.
Figure 9:
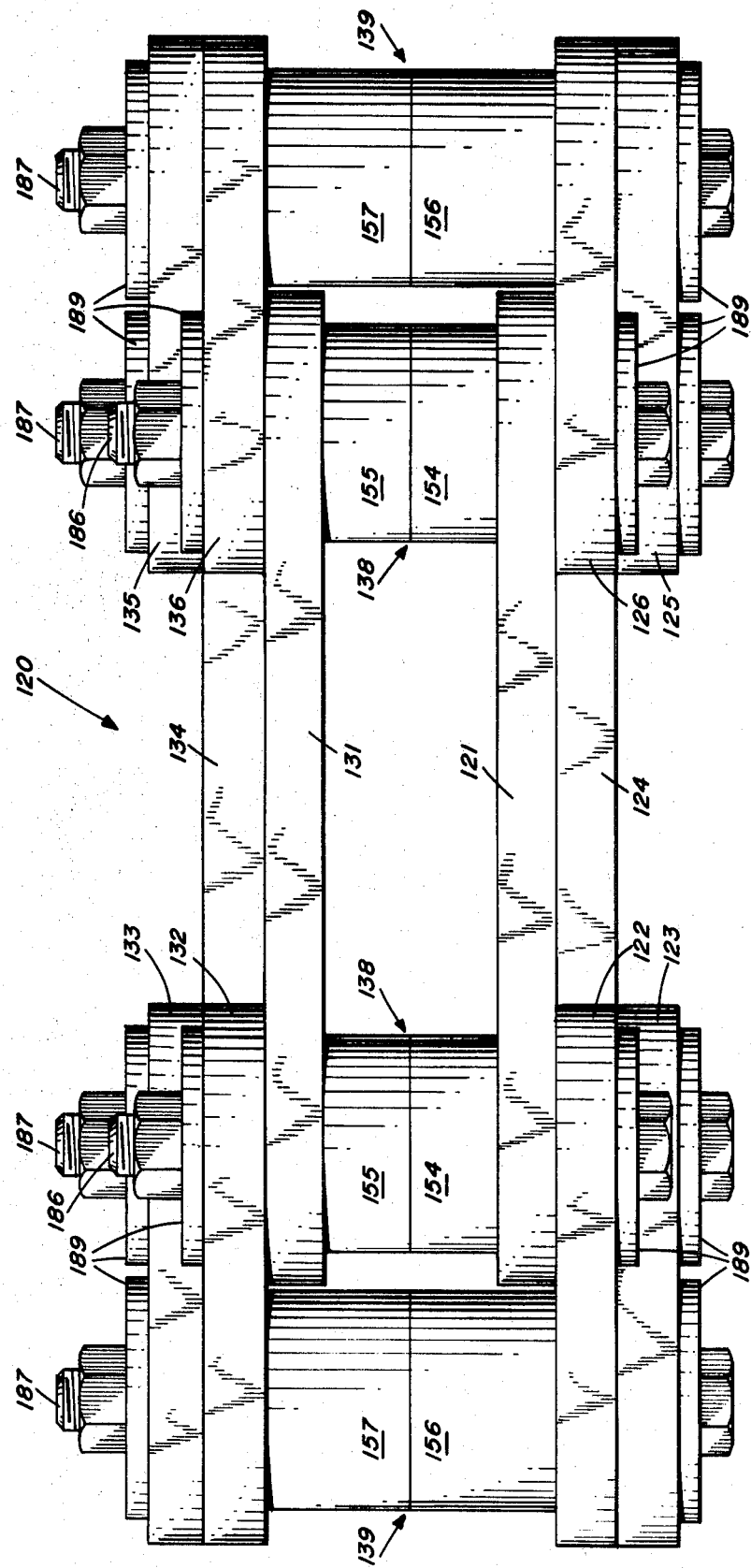
FIG. 9 is a top view plan view of the mount of FIG. 8.
Figure 10:
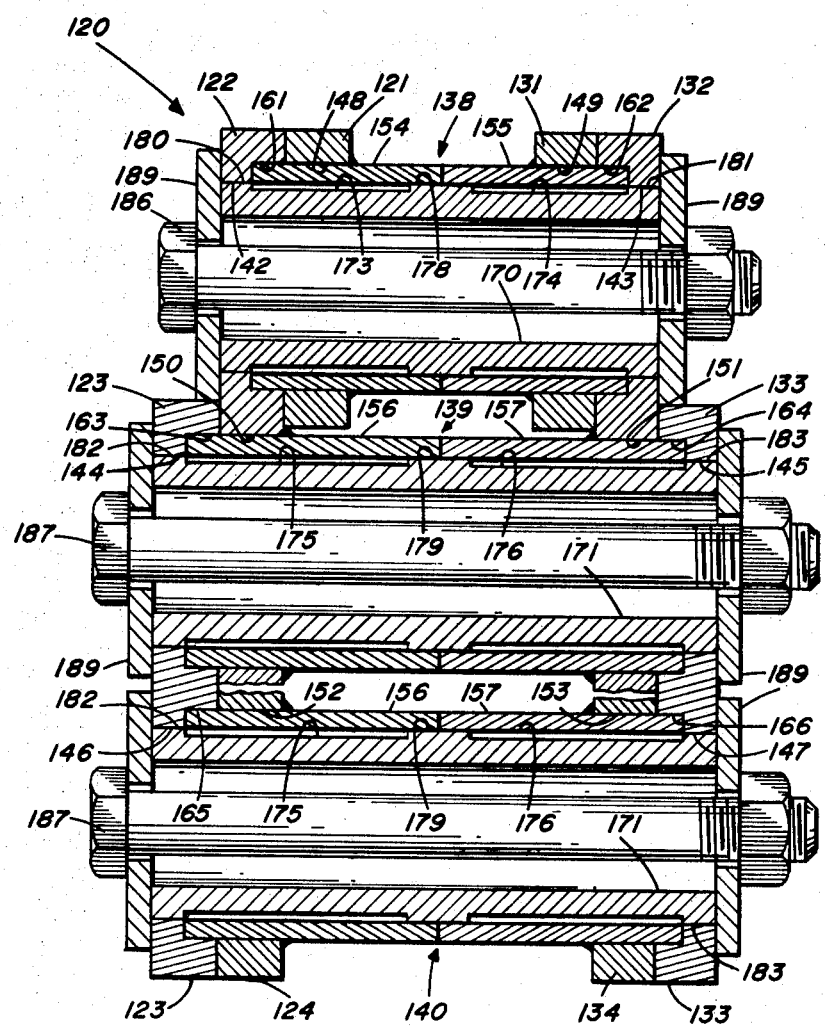
FIG. 10 is a sectional view taken on line 10-10 of FIG. 8.

Referring now to FIGS. 8 through 10, another embodiment of the shock mount is illustrated in which the inner tubes of the pin units may be easily replaced to restore the mount to its extended or original condition shown in FIG. 8 after the mount has been partially or totally collapsed due to the reception of shock energy thereby. The reference numeral 120 generally designates this form of mount which comprises two sets of spaced, parallel, generally hexagonally arranged links 121 through 126 and 131 through 136, respectively, which are the equivalents of the sets of links of the first form. The links are joined at the overlapping end portions or junctures thereof by means of pin units as in the previous form. The upper pin units, which are identical to each other, are generally designated 138 while the intermediate and lower pairs of pin units, also of identical construction to each other, are generally designated 139 and 140, respectively.

The links are basically of the same construction as that of the links in the previous form except that the bores 142 through 147 are of octagonal shape rather than cylindrical. The bores 148 through 153 are cylindrical. The pin units outer tube members 154 through 157 are welded to the inner link members as before and are of cylindrical outer configurations also as before but are provided with octagonal inner peripheries of the same dimensions as octagonal bores 142 through 147. Said outer tubes are rotatably received within the counterbores 161 through 166 of the outer links as in the previous form. In the present form, the two outer tubes of each pin unit extend all the way to the center of the mount in the transverse direction (see FIG. 10) abutting each other at the center.

The inner tubes 170 and 171 of the pin units are constructed from tubing having a cylindrical inner periphery and octagonal outer periphery which is able to slide within and mate with the octagonal inner peripheries of the outer tubes 154 through 157 and the octagonal bores 142 through 147 of the outer links. The outer peripheries of the inner tubes are machined at 173 through 176 to remove the octagonal formations thereof and produce cylindrical outer peripheral portions in these places. This leaves the center portions 178 and 179 and the opposite end portions 180 through 183 in the octagonal configuration for nonrotatable connections between the inner and outer tubes at 178 and 179 and between the inner tubes and outer links at 142 through 147. The purpose of the relieved or cylindrical portions 173 through 176 is to prevent any engagement between the inner and outer tubes along the extent of the cylindrical portions so that the outer end portions of the outer tubes received within the counterbores of the outer links are free to rotate therewithin and also so that the inner and outer tubes are free to be twisted relative to each other except for the center portions of the inner tubes 178 and 179 and the central end portions of the outer tubes where the latter engage the former for the transmission of the twisting or torque between the tubes.

The shock mount 120 is retained in the assembled condition by the use of nut and bolt units 186 and 187 extending through the pin units 138 through 140 as shown in FIG. 10 which bolt units are tightened against washers 189 which rests against the ends of the inner tubes 170 and 171 and extend over the outer surfaces of the outer links adjacent the bores 142 through 147.

The construction of the mount to the right of the vertical center plane thereof as in FIG. 8 is identical to that to the left of said center plane.

OPERATION (FIGS. 8—10)

This embodiment operates exactly in the same fashion as did the previous form. Where there is permanent deformation or yielding of the inner tubes due to torsion therein, these tubes of the pin units may be replaced for restoring the mount to its original or extended condition.

Although a single inner tube and a pair of outer tubes are provided for each pin unit in the FIGS. 8 through 10 form, a single outer tube in place of each pair thereof and a pair of inner tubes abutting at the center in place of each single inner tube may be employed in place of the construction shown if desired. The same could apply to the welded form of FIGS. 1 through 7 with spot welding, for instance, being used to weld the inner and outer tubes together in lieu of the welding shown or, there could be a single inner and single outer tube used in each pin unit spot welded, for instance, together at the center.

Although each form of shock mount disclosed is of double frame construction, that is, each form has two sets of links at opposite sides thereof, a mount which is in effect one transverse half of either form of mount shown, that is, the right or left half of either of the mounts as seen in FIGS. 3, 4, and 5, taken together, and FIG. 10 may be employed if desired. Or, a mount consisting of in effect one longitudinal half of either form of mount shown in the drawing, that is, the half shown to the right or left of the vertical transverse center plane of either of the mounts as seen in FIGS. 1 and 8 may be employed.

Mounts may be constructed of polygonal forms other than hexagonal and other arrangements of links or members of other than polygonal forms may be provided if desired. The basic unit of the inventive mount or shock dissipating device consists of a pair of members, as for example links 11 and 12 of the first form, connected together by a pin unit such as one transverse half of unit 30. Such a pair of members could itself be used as a shock energy dissipator by connecting both ends of the members remote from the pin unit to the deck of a ship, for example, in a manner allowing relative rotation between said members when the inner tube is twisted with the equipment to be protected being supported wholly or in part by the pair of members where they come together. Various combinations of this basic unit or pairs of members relatively rotatably connected together by pin units in accordance with the present invention may be employed for shock energy dissipation purposes in general rather than only in marine use. For example, a zigzag formation of several basic units pinned together per this invention may be employed or several parallel links or members may be pinned to a base member for the support of equipment. Of course, any number of mounts or devices of the present invention may be used for the total support of equipment to be protected. Although in connection with marine or shipboard use the present invention has been described as a shock mount, the same may be applied for the support of a platform upon which personnel may stand.

Obviously many modifications and variations of the present invention are possible in the light of the above teachings.

I claim:

1. A torsion yield shock energy dissipating structure comprising:
   a first and a second member, the first member having an inwardly facing, substantially cylindrical wall;
   an outer tube extending within and along at least a portion of the wall and being rotatable relative to the wall, the outer tube being connected to said second member;
   an inner tube extending within the outer tube and being connected to said first member, the inner and outer tubes being connected to each other at a substantial distance from the connection between the inner tube and said first member; and
   whereby a sufficiently large amount of shock energy imparted to said members so as to tend to rotate said members relative to each other about the common axis of the tubes causes torsional yielding of the inner tube for using up some of the shock energy.

2. The subject matter of claim 1 in which a pair of first members, a pair of second members, and a pair of outer tubes are provided, the inner tube extending within each of the outer tubes and being connected to each of the first members, the outer tubes being connected to the inner tube at least near the center of the inner tube and extending within and along at least portions of the cylindrical walls of the first members respectively, the outer tubes being connected to the second members respectively.

3. The subject matter of claim 1 in which each of said members is provided with a bore and said first member is provided with a cylindrical counterbore the surface of which is the substantially cylindrical wall, the inner tube fitting within the bore of said first member and the outer tube fitting within the counterbore of said first member and the bore of said second member, the outer tube being substantially cylindrical around its outer periphery where it fits within said counterbore.

4. The subject matter of claim 3 in which the inner tube is polygonal at two places around the outer periphery thereof, the bore of said first member being polygonal and engaging one of said polygonal places of the inner tube for forming the connection between the inner tube and said first member, the outer tube being polygonal around the inner periphery thereof at one place therealong which place engages the other of said polygonal places of the inner tube for forming the connection between the tubes.

5. A torsion yield shock energy dissipating structure comprising:

three members, the first and second members each having an end portion overlapping the end portion of the other member, the first and second members constituting a first pair of members, an opposite end portion of the second member and an end portion of the third member overlapping each other, the second and third members constituting a second pair of members, one of the members of each pair having an inwardly facing substantially cylindrical wall at the juncture of the pair, an outer tube at the juncture of each pair of members and extending within and along at least a portion of each of said walls and being rotatable relative to the wall, each outer tube being substantially nonrotatably connected to the member of its pair of members not having a substantially cylindrical wall at the juncture of the pair;

an inner tube extending within each outer tube and being connected to the member of its pair of members having a substantially cylindrical wall at the juncture of the pair;

each of the inner tubes being connected to the outer tube within which it extends at a substantial distance from the connection between such inner tube and the member of its pair to which it is connected; and whereby a sufficiently large amount of shock energy imparted to said members so as to tend to rotate said members of each of said pairs of members relative to each other about the common axis of the tubes of the pair of members causes torsional yielding of the inner tube of the pair of members.

6. The subject matter of claim 5 in which each member of each pair of members is provided with a bore at the juncture of the pair and one of the members of each pair is provided with a substantially cylindrical counterbore at the juncture of the pair which is said substantially cylindrical wall of said one member of each pair, each inner tube fitting within the bore of the member of its pair having the counterbore adjacent said bore, each outer tube fitting within the counterbore of the member of its pair having the counterbore at the juncture of the pair of members and also fitting within the bore of the other members and also fitting within the bore of the other member of its pair of members, the outer tubes being substantially cylindrical around their outer peripheries where they fit within the respective counterbores.

7. The subject matter of claim 6 in which each inner tube is polygonal at two places around the outer periphery thereof, each bore adjacent a counterbore being polygonal and engaging one of said polygonal places of an inner tube for forming the connection between such tube and member having the counterbore, each outer tube being polygonal around the inner periphery thereof at one place therealong which place engages the other of said polygonal places of the inner tube therewith for forming the connection between such outer and inner tubes.

8. A torsion yield shock energy dissipating frame comprising:

a set of links of at least six in number arranged in end to end slightly overlapping fashion;

a pin unit at each place of overlapping of the links for connecting each pair of overlapped links, each link of each pair being provided with a bore in the overlapped portions thereof and one of the links of each pair being provided with a substantially cylindrical counterbore;

each pin unit comprising an inner and outer tube, the inner tube of each unit fitting within the bore of one link and outer tube of the unit fitting within the counterbore of the same link adjacent said bore thereof and being rotatable relative to the counterbore, each outer tube also fitting within the bore of the other link of the pair, each outer tube being connected to said other link of the pair, each inner tube being connected to the link having the counterbore adjacent the bore the inner tube fits within, each inner tube being connected to the outer tube within which it extends at a substantial distance from the connection of such inner tube to the link to which it is connected, the outer tube of each pin unit being substantially cylindrical around its outer periphery where it fits within its counterbore; and whereby a sufficiently large amount of shock energy imparted to one side of the frame causes torsional yielding of each inner tube and at least partial permanent collapse of said frame for using up some of the shock energy and no torsional yielding of the outer tubes while at least most of the stressing in shear takes place in the outer tubes.

9. The subject matter of claim 8 and additionally a second set of links of at least six in number and like the above recited set of links but with the links thereof arranged in the reverse manner, the links of the second set being substantially coextensive with the comparable links of the first set, said pin units also connecting the pairs of overlapped links of the second set of links respectively, each pin unit having a second outer tube around the inner tube and connected to the latter near the center of the latter, the second outer tube of each pin unit fitting within the bore of the link of its pair of links of the second set of links not having the counterbore at the place of overlapping of the links of this pair and also rotatably fitting within the adjacent counterbore of the other link of the pair, the inner tube of each pin unit also being connected to the link of its pair of links of the second set of links having a counterbore at the place of overlapping of this pair of links and the second outer tube of such pin unit being connected to the other link of this pair of links.